United States Patent [19]

McGee

[11] 4,433,985
[45] Feb. 28, 1984

[54] AIR SCRUBBING AND PURIFYING SYSTEM

[76] Inventor: Terrill A. McGee, 525 S. Ardmore St., Los Angeles, Calif. 90020

[21] Appl. No.: 332,521

[22] Filed: Dec. 21, 1981

[51] Int. Cl.³ .............. B01D 47/12; B01D 50/00; A62C 35/34
[52] U.S. Cl. .................................. 55/217; 55/223; 55/250; 55/259; 55/385 R; 98/87; 49/70; 169/54; 169/91
[58] Field of Search .............. 55/223, 225, 233, 250, 55/259, 210, 217, 385 R, 385 A; 98/87; 169/54, 91; 220/88 A; 49/30, 70; 422/123, 124

[56] References Cited

U.S. PATENT DOCUMENTS

| 1,103,509 | 7/1914 | Harker | 55/259 |
|---|---|---|---|
| 2,197,004 | 4/1940 | Myers | 55/233 |
| 2,922,489 | 1/1960 | Hollingsworth | 55/217 |
| 3,051,281 | 8/1962 | Huff, Jr. | 49/30 |
| 3,122,984 | 3/1964 | Rosenfeld | 55/250 |
| 3,370,404 | 2/1968 | Leeder | 55/259 |
| 3,642,259 | 2/1972 | Bowden | 55/259 |
| 3,772,855 | 11/1973 | Domnitch | 55/233 |
| 3,856,487 | 12/1974 | Perez | 55/233 |
| 3,898,059 | 8/1975 | Foster | 55/223 |
| 3,926,101 | 12/1975 | Moss | 55/210 |

Primary Examiner—David L. Lacey
Attorney, Agent, or Firm—Donald Diamond

[57] ABSTRACT

An air scrubbing and purifying system is provided for effecting removal of combustion products from contaminated air generated by a fire in progress in an enclosed room. The system comprises (a) electrically-powered intake fans for withdrawing contaminated air from the enclosed room, (b) air washing and filtering stations adapted to treat and remove soot, smoke, and other combustion-product gasses from the contaminated air, and (c) electrically-powered discharge fans for impelling the treated air into the enclosed room. The system is actuated and made operational by means of a smoke or fire detector and is powered by integral batteries kept in a charged state by an appropriate trickle charging device. The system is advantageously disposed within a door structure for the enclosed room and may include extendable seal strips at the peripheral surfaces of the door to aid in sealing the enclosed room from adjacent areas. The air washing station includes a reservoir for storing the washing fluid which may be ordinary tap water, and the air filtering station may include activated charcoal.

12 Claims, 6 Drawing Figures

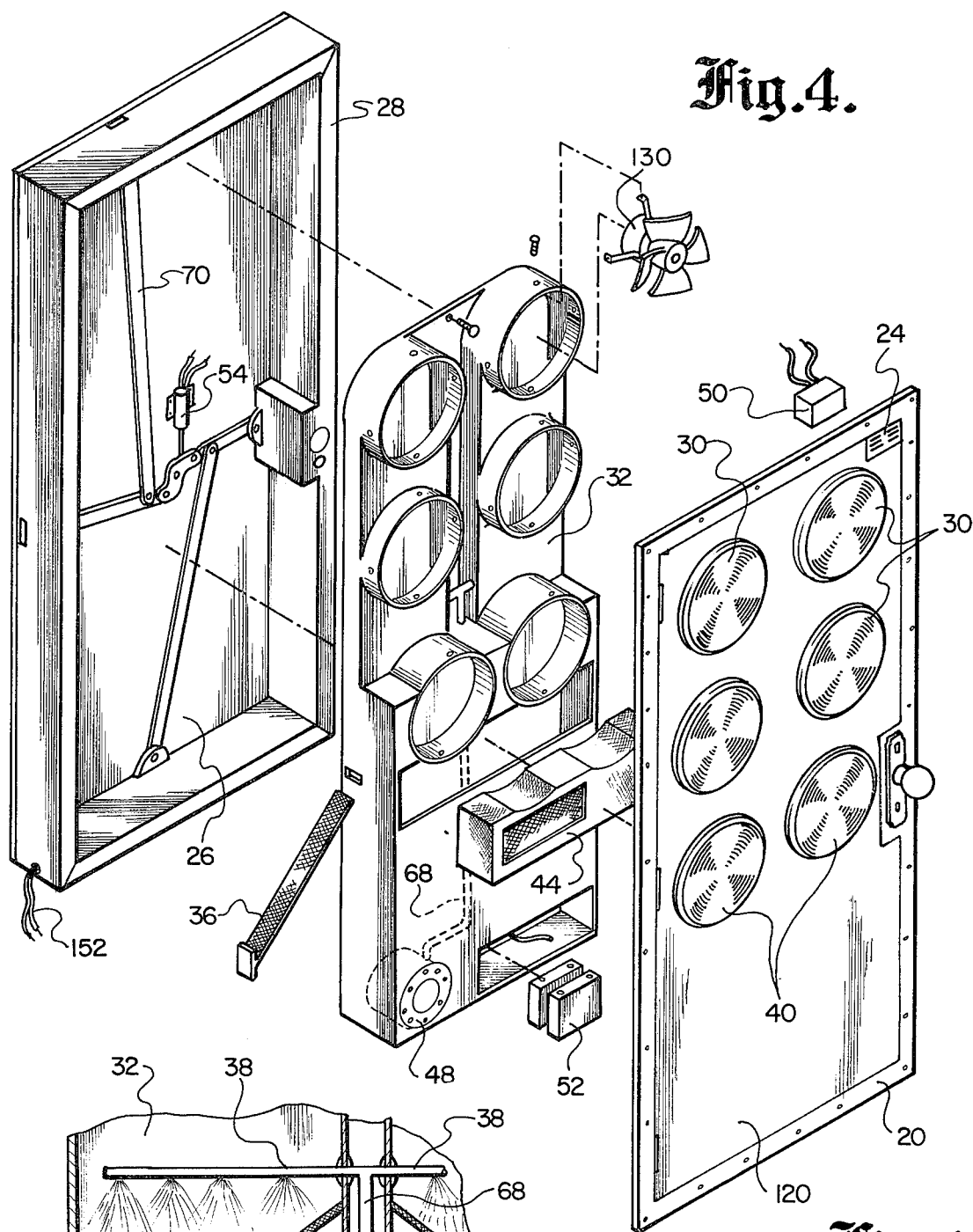
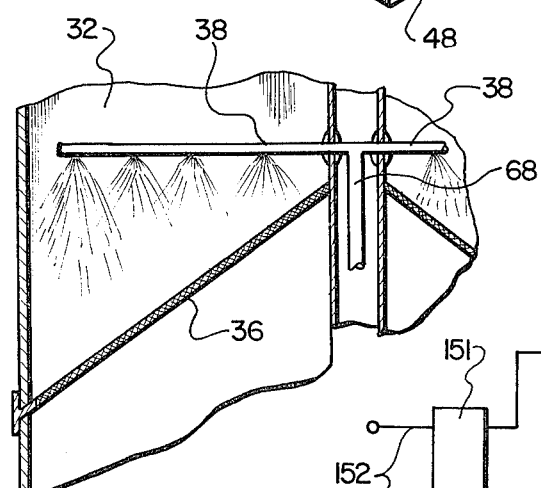
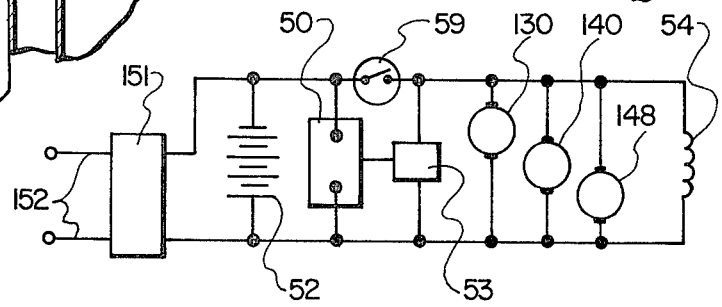

AIR SCRUBBING AND PURIFYING SYSTEM

BACKGROUND OF THE INVENTION

This invention relates to devices for scrubbing and purifying air, and, more particularly, to devices for removing smoke and other combustion products from enclosed spaces in the event of fire in such enclosures.

In the art of fire-fighting, the problems arising from the delay between the initiation of a fire, even a small one, and the arrival of specialized personnel and equipment to deal with it has remained a major problem. The installation in structures of various types of smoke and fire detectors and the provision of sprinklers has been of value in such situations by reducing the response time of fire-fighting units and by providing some automatic remedy towards the suppression of fires, respectively. However, the insidious effects of early, smoldering fires continue to present a major problem for the occupants of enclosed spaces where such fires frequently originate.

This problem is based on the incapacitating effect on people in an enclosed structural environment of even a relatively mild fire as a result of soot, smoke and other combustion products generated by such fire. Moreover, this hazard can, and frequently does, arise when people are asleep or otherwise unaware that something may be awry.

Typically, such problems are often encountered in institutional environments such as hotels, hospitals, and the like where the people occupying such structures may become incapacitated to the point of insensibility at an early stage in the development of a fire due to the presence of evolving combustion products.

It is, therefore, an object of this invention to provide an environmental air scrubbing system for an enclosed space which, upon the detection of a developing fire, gives alarm and, automatically proceeds to scrub the air in the enclosed space of combustion products, so as to enhance the survival of occupants of such space until appropriate assistance arrives at the scene.

Another object of this invention is to describe an effective combination of components and devices which can expeditiously and economically attain the aforesaid function.

A further object of this invention is to provide a combination of components capable of sensing combustion products in the atmospheric air of an enclosed space and extracting the combustion products from such air, which combination of components may be advantageously disposed within an access door for the enclosed space.

A still further object of this invention is to provide actuatable means integrated with the aforesaid access door, which houses the sensing and purifying components, for sealing the doorway gap when the door is in the closed position, so as to prevent the ingress of combustion products from adjoining areas into the enclosed space, or the development of drafts tending to increase the combustion rate of an incipient fire in such space.

SUMMARY OF THE INVENTION

The foregoing objects, as well as other objects and advantages of the invention, are attained through an interconnected system of components which sense the presence of combustion products in the atmospheric air of an enclosed space, impel such atmospheric air through washing and filtering stations, and return treated and purified air into the enclosed space.

In the preferred embodiment, all such components are disposed within the confines of a housing unit which may also serve as an access door to the enclosed space. The air flow and treatment components encompassed by the system of the preferred embodiment of this invention, comprise: one or more intake fans for withdrawing contaminated atmospheric air from the enclosed space and passing such air into the cleansing system; a washing station adapted to remove particulate matter suspended in the air; a filtering station adapted to remove fine particles and combustion-product gasses from the contaminated air; and one or more discharge fans to impel the treated and purified air back into the enclosed space. The system also incorporates a sensing device as, for example, a smoke detector or heat detector to provide warning of a developing fire situation and to initiate the operation of the cleansing system, and, further, incorporates means for storing energy in the form of a battery or compressed air bottle, for operating the system in the event of a general power failure associated with the fire itself.

The preferred embodiment of the invention also makes provision for sealing the periphery of the access door, which houses the system, against air movement between the enclosed space and adjacent areas.

The system of this invention interconnects the several components into a novel device whose primary purpose is the prevention of the incapacitation of occupants of the enclosed space, as well as adjacent areas, through smoke inhalation, and the provision of decontaminated, breathable air to such occupants of the enclosed space until aid, which can be sought by the automatic or manual operation of the smoke and fire detector incorporated into the system, can be brought to them.

The system of this invention is readily incorporated into access door assemblies as well as fire door separations which are capable of replacing access doors of conventional construction, so as to permit the ready installation thereof in both new construction and as replacements for existing doors in buildings without plenums or smoke removal systems at reasonable cost.

DESCRIPTION OF THE DRAWINGS

FIG. 4 is an exploded view that separately illustrates the major components in the air filtering and purifying system.

FIG. 5 is a fragmentary frontal section through a preferred embodiment of the invention, showing the wash liquid flow pattern over an inclined washing screen that forms part of the filtering system therein.

FIG. 6 is a schematic diagram of the electrical power and control system of the embodiment shown in FIG. 4.

DETAILED DESCRIPTION

Figure 1:
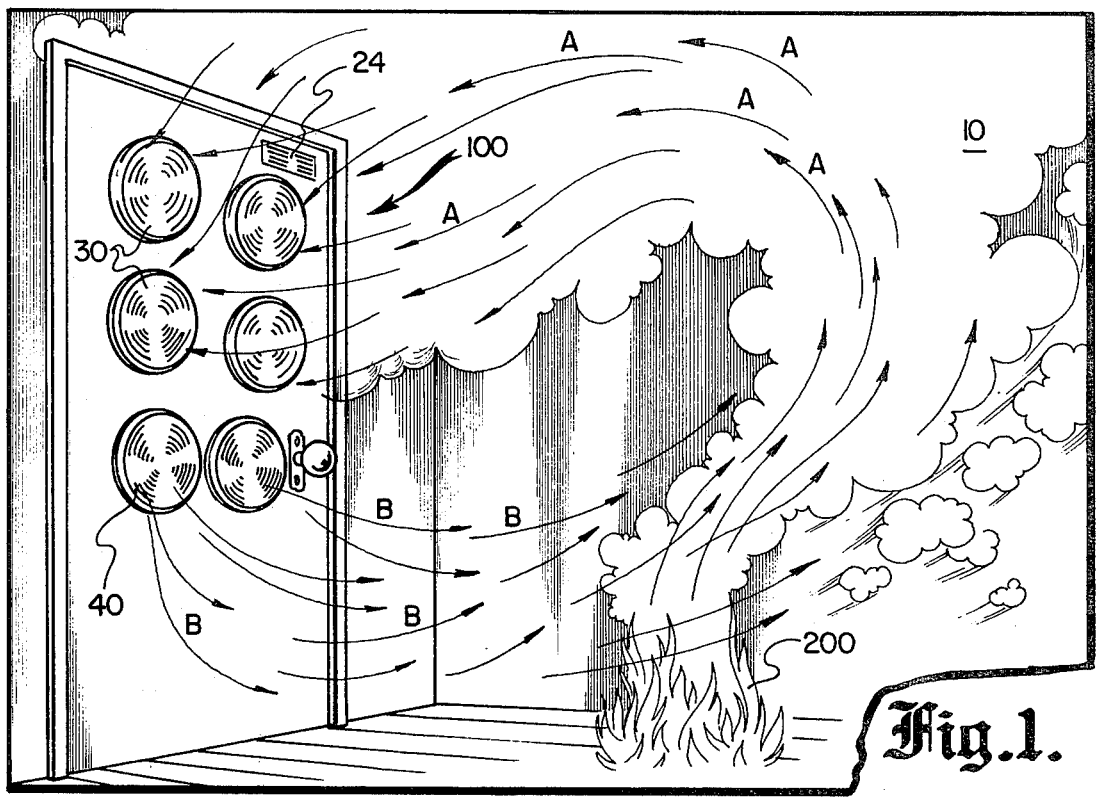
FIG. 1 is a perspective view of an enclosed room having an access door that incorporates the air filtering and purifying system of the invention and schematically shows airflow with the system in operation and a fire in progress.
Figure 3:
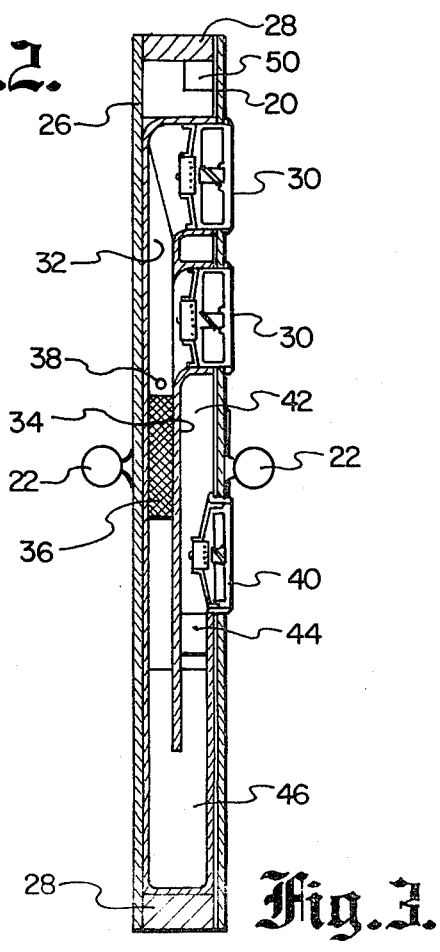
FIG. 3 is a vertical section, taken along section line 3—3 in FIG. 2 and shows the internal air passages of the system.

The perspective view of FIG. 1 shows an enclosed room 10 provided with an air filtering and purifying system 100 that is incorporated into the access door thereof. The partly schematic illustration of FIG. 1 also shows a fire 200 in progress within the enclosed room 10, with the heated atmospheric air, contaminated with combustion products, rising towards the ceiling. The air treatment system of the invention is actuated and made operational by an integral smoke detector device 50, which is shown in FIGS. 3 and 4. Intake fans 30 draw the rising contaminated air into the air treatment system. The flow of contaminated air into the system is shown by directional lines marked A. At the same time, discharge fans 40 return treated and purified air into the enclosed room 10, as indicated by directional lines marked B.

Figure 2:
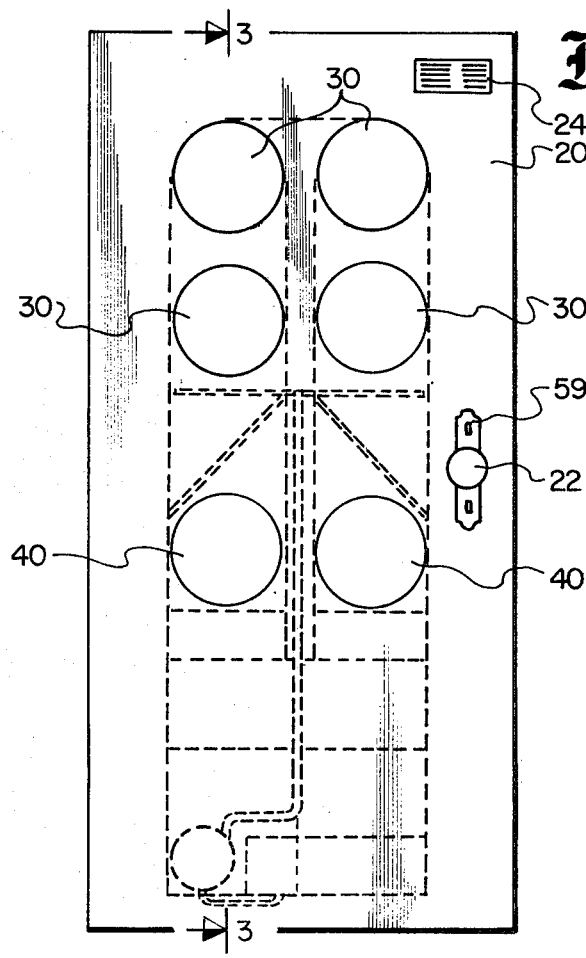
FIG. 2 is a frontal aspect of the air filtering and purifying system of FIG. 1 with internal components shown in broken outline.

The frontal view of FIG. 2, which also illustrates the air filtering and purifying system 100, shows, in a front panel 20 of the door assembly, a grille 24 that overlies the smoke detector device. As shown, the smoke detector device is located near the upper edge of the access door for maximizing its effectiveness with respect to rising combustion products. The intake ports for the intake fans 30 and the discharge ports for the discharge fans 40 are also shown in FIG. 2 in schematic form, as well as doorknob 22.

As shown in FIG. 3, the access door comprises a front panel 20, a corresponding uperforated rear panel 26, and a peripheral sideframe 28 which define a hollow internal volume that is subdivided into an intake plenum 32 and a discharge plenum 42 by a partition 34. The lower portion of the internal volume of the access door is provided with or developed as a liquid tank 46 with the lower edge of the partition 34 projecting for some distance below the surface of the air washing solution that is charged into the tank. The air washing solution may be chosen to suit particular climactic and service conditions. A suitable washing solution is ordinary tap-water which may be treated to prevent undesirable changes such as the growth of algae.

A deluge type, fluid transversable, washing curtain 36, that is fabricated from non-combustible material, is angularly disposed in the intake plenum 32 below a spray header 38 that is adapted to provide a wash solution spray which forms a flowing wash solution on the surface of the washing curtain 36. The function of the flowing wash solution is to effect preliminary treatment of the incoming airstream. The washing curtain may be so selected as to remove, by filtration, particulate matter from the airstream, as air drawn in by the intake fans 30 is directed downward towards the surface of the wash solution in the liquid holding tank 46.

Air from the intake plenum 32 is forced through the wash solution in the liquid holding tank 46 and, after passing through a filter pack 44, is delivered into the discharge plenum 42. Any suitable filter material may be employed in filter pack 44. Activated material such as finely granulated charcoal in a suitable matrix is particularly well suited to remove harmful combustion components from the airstream, and the filter pack containing such material may be formed in a manner well-known in the art of constructing gas masks and similar filtering and detoxifying devices.

The treated, cooled and purified air entering the discharge plenum 42 is conveyed to the enclosed room 10 through discharge ports by means of discharge fans 40. The reconveyed, treated air tends to reduce the higher atmospheric pressure in the fire area.

The exploded view of FIG. 4 is a particularly clear illustration of the several components, and their relative positions and interactions, in the preferred embodiment of the air filtering and purifying system of this invention as incorporated into a door assembly formed by a front panel 20, a rear panel 26 and a peripheral frame 28.

The powered components of the system include a smoke detector 50, intake fans 30 and discharge fans 40, a wash solution pump 48, and a solenoid operator 54 for a peripherally extendable seal. These components derive their motive power from the building service circuit or from a battery pack 52 which is maintained in a charged condition by an integral rectifying and trickle charging device, (not shown), via a power cable 152 connecting the purifying systems's electrical power supply with the building service circuit. To permit ready movement of the door, the power cable 152 is located near the hinge line of the door assembly.

The pump unit 48 is employed to pump the wash solution from the liquid holding tank 46 to the spray headers 38 via conduit 68. A pump which effects transit of the wash solution at moderately elevated pressure is suitable for this purpose. The spray headers 38, as previously described, distribute the wash solution over the upper surface of the washing curtain 36 for a preliminary scrubbing of the contaminated air passing through the purifying system 100. The wash solution flows through and around the lower end of the washing curtain for return to the recirculating and holding tank 46. The washing curtain may take the form of a pair of inclined filters, with one filter being disposed on one side of the central spine of the filtering assembly and the other filter being disposed on the other side of that assembly.

The fragmentary, frontal section of FIG. 5 illustrates the relative positioning of the inclined washing curtains 36 in the intake plenum 32, as well as the location and operation of the spray headers 38 relative to the inclined washing curtains.

The doorway gap, when the access door is in the closed position, can be sealed through the use of extendable sealing strips that are incorporated in the peripheral frame 28 of the door. As shown in FIG. 4, a solenoid operator 54 is connected to an eccentric device for operating linkage rods 70 that are secured to the sealing strips. The solenoid operator, which is actuated at the same time as the actuation of the wash solution pump 48 and the air intake fans 30 and discharge fans 40, secures the enclosed room from drafts drawn into or forced out of the room via the periphery of the doorway. Such drafts are generally undesirable under fire conditions since they may entrain and carry additional contaminants into or out of the enclosed room, or provide a means for fanning the flames within the room. This sealing assembly is adapted to be manually retracted from either the inside or the outside of the enclosed room through the use of a cooperating lever or handle, by firefighting or other rescue personnel, so as to permit the ready opening of the door as required.

The components of the air scrubbing and purifying system are accessible for testing and maintenance via an access panel 120.

FIG. 6 is a schematic diagram of the electrical power and control system incorporated into the embodiment of FIG. 5. The system which is normally dormant, is connected to the building supply circuit via conductors in cable 152. These conductors connect to a rectifier 151 with the output of the rectifier being in parallel with the battery pack 52. The rectifier charges the battery during the inactive period of the system and also supplies power to the smoke detector 50. The smoke detector may be an ionizing or photoelectric type or a combination thereof. When the detector is exposed to combustion products or other harmful vapors, it sounds an integral alarm and also closes the power circuit through relay 53. The relay is in parallel with a manual 'on' switch 59, accessible from the protected space, permitting the activation of the system in the event of an emergency undetected by the smoke-sensitive device 50.

The active elements of the system—typified in the schematic diagram by intake fan motor 130, discharge fan motor 140, pump motor 148, and seal operator relay 54—are powered from either the rectifier 151 directly or, in the event of an interruption of the power supply, from the battery 52.

While the preferred embodiment of the invention has been described with reference to active devices that are powered by the building service circuit or by an emergency electrical battery pack, it should also be noted that alternative means can be employed for powering such devices. Thus, a compressed air cylinder can be used for this purpose.

The air filtering and purifying system of this invention is designed specifically to provide means for preserving and sustaining life inside an enclosed room exposed to combustion products for a short, but sufficient length of time, to permit fire fighting and rescue operations to be undertaken. It is also designed to restrict smoke flow into adjacent areas. The system is initiated by an integral sensor for combustion products which is commonly referred to as a smoke detector. This sensor may also provide internal and external alarm signals that are commonly associated with such devices. In some circumstances, it may also be desirable to provide additional initiating means for the system such as manual start switches and heat sensors to further increase the reliability and utility of the system.

The system described herein is adapted to remove hazardous products from contaminated air. In addition to the removal of combustion products as hereinabove described, the system of this invention may also be used to remove non-combustion hazardous chemicals as well as particles (such as nuisance dust) from contaminated air.

While in the foregoing description and accompanying drawing there has been shown and described the preferred embodiment of this invention, it will be understood, of course, that minor changes may be made in the details of construction as well as in the combination and arrangement of parts without departing from the spirit and scope of the invention as claimed.

That which is claimed is:

1. An air scrubbing and purifying system for treating atmospheric air disposed within an enclosed space and contaminated with hazardous products to effect removal of such products from said air, comprising:

air treatment means comprising (a) at least one washing station which includes a liquid medium for washing said contaminated atmospheric air passing therethrough, and (b) at least one purifying station which includes an activated solid medium for the removal of hazardous products from said contaminated atmospheric air passing therethrough;

air moving means comprising (a) electrically actuated intake means for impelling contaminated atmospheric air into and through said air treatment means and (b) electrically actuated discharge means for returning treated air to said enclosed space;

a source of energy connected to said air moving means for energizing said air moving means;

and detector means operably interconnected with said air moving means for sensing hazardous products in contaminated atmospheric air in said enclosed space;

whereby said detector means, upon sensing hazardous products in said contaminated atmospheric air in said enclosed space, actuates said air moving means resulting in said contaminated atmospheric air being passed through said at least one washing and said at least one purifying stations and returing to the enclosed space in uncontaminated form that is suitable for human respiration.

2. The system of claim 1 wherein the source of energy is an electrical storage battery.

3. The system of claim 1 wherein said detector means is a smoke detector.

4. The system of claim 1 wherein said detector means is a heat detector.

5. The system of claim 1 wherein each of said intake and discharge means includes at least one rotary fan.

6. The system of claim 1 wherein said system includes an intake plenum that communicates successively with said at least one washing station and said at least one purifying station, and said intake means includes a plurality of rotary intake fans.

7. The system of claim 1 wherein said system includes a discharge plenum that communicates from said at least one purifying station to said enclosed space, and said discharge means includes a plurality of rotary discharge fans.

8. The system of claim 1 wherein said system is disposed within an access door for said enclosed space.

9. The system of claim 8 wherein said system additionally includes electrically actuated sealing means for sealing the peripheral space around the access door.

10. The system of claim 1 wherein said activated solid medium is activated charcoal.

11. The system of claim 1 wherein said at least one washing station includes a washing tank for holding said liquid washing medium.

12. The system of claim 11 wherein said air treatment means further includes a preliminary washing station for preliminary scrubbing said contaminated air, said preliminary washing station comprising fluid traversable, washing curtain means in combination with electrical pump means and conduit means that convey liquid washing medium from said washing tank to the upper surface of said washing curtain means, with the conveyed liquid washing medium returning to said washing tank.

* * * * *